United States Patent Office 2,713,124
Patented July 12, 1955

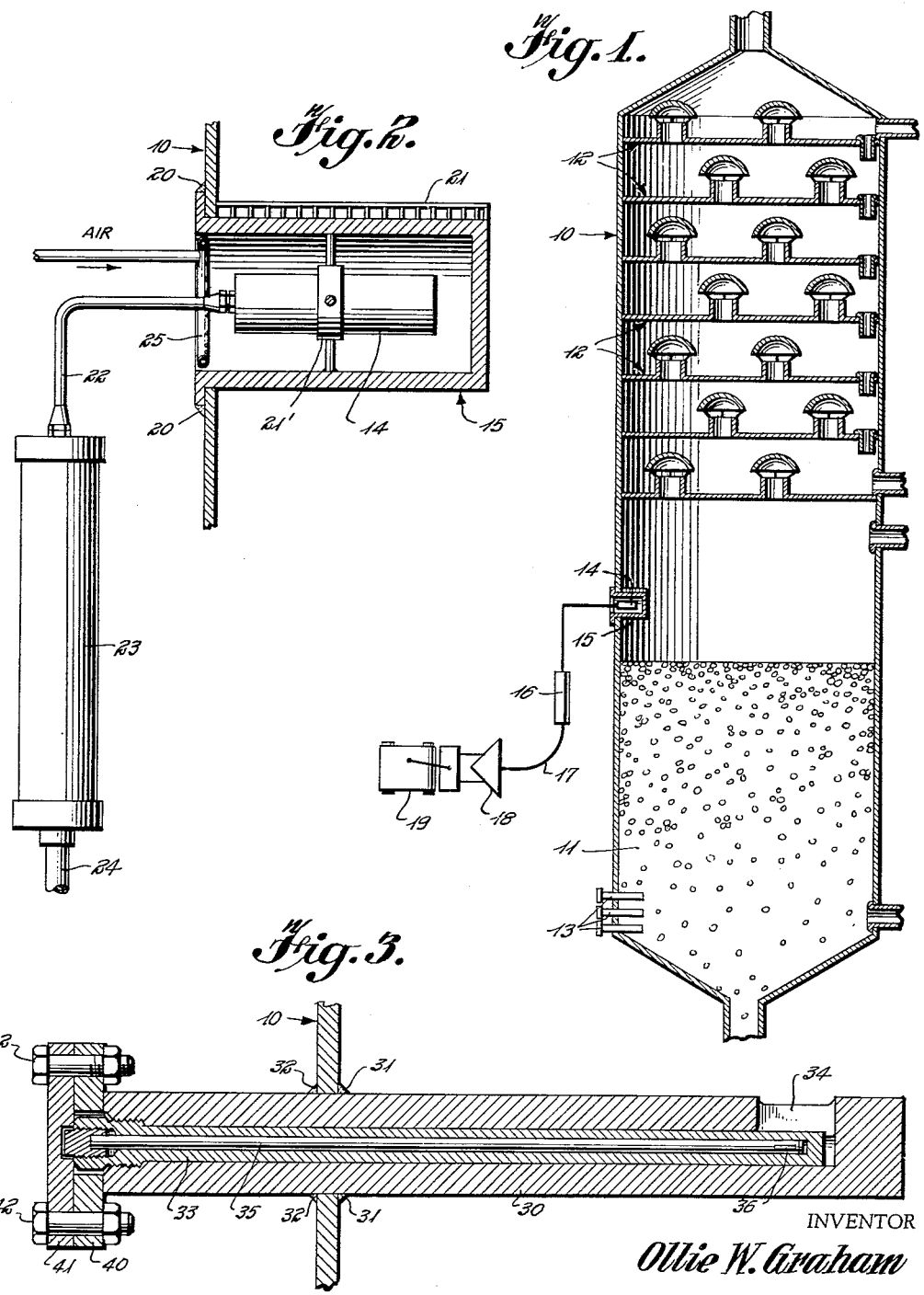

2,713,124

RADIOACTIVE RADIATION APPARATUS FOR MEASUREMENT OF LEVEL OF MATERIAL IN TANKS

Ollie W. Graham, Tulsa, Okla., assignor to Instruments, Inc., Tulsa, Okla., a corporation of Oklahoma Application November 1, 1950, Serial No. 193,465

3 Claims. (Cl. 250—43.5)

This invention relates to apparatus for determining the level of a material contained in a closed tank. More particularly this invention relates to apparatus for determining the level of a material in a very large tank of the type often found around oil refineries. The apparatus of this invention is particularly suitable for the determination of the level of a solid catalyst in one of the large storage tanks or reactors or regenerators that is commonly found in a catalytic cracking installation. Such tanks are often of a height of fifty feet or more and contain trays or baffles or other parts that make the determination of catalyst level particularly difficult.

This invention relates to the determination of the level of a material contained in a tank by the general process of so positioning a source of radioactive radiation and a detector of radioactive radiation that the path between the two will become increasingly filled with the material to be measured as its level rises. Thus the radioactive radiation received by the detector will decrease, and an indicator or recorder that indicates or records the quantity of radiations received will indicate or record the level of the material under observation.

Prior to this invention, the general process described above was applied in a number of ways but none were satisfactory for the purpose of measuring levels under the conditions encountered in the measurement of catalyst levels in a catalytic cracking plant and the apparatus of this invention has also been found useful in the measurement of levels in other similar types of installation.

For example, prior to this invention a source of radioactivity has been mounted in a float and a detector of radioactivity has been mounted either on the side of the tank or on top of the tank, or has been moved alongside of the tank. In other installations the source of radioactivity and the detector have been mounted in fixed positions with the source of radioactivity on one side of the tank and the detector on the other, or with the source just inside of the tank and the detector on the outside of the tank.

None of these arrangements work well with a tall tank and a wide range of levels to be measured, and this is particularly true when the top of the tank contains trays or baffles or other parts. The arrangements in which the source and the detector are permanently positioned at near the same level do not give a sufficient range of measurement, and the arrangements in which a detector is placed above the top of the tank and the source of radiation is floated within the tank does not give saatisfactory results and requires too much radioactive material, particularly when the top of the tank is some distance away from the level to be measured or when there are plates, baffles or other mechanism in the top of the tank between the source and the detector. The arrangement in which the source of radioactivity is floated in the tank and is located by manually moving a detector alongside of the tank is cumbersome and necessitates a moving source of radiation which is always a possible source of trouble, since it may become stuck in one position.

The possibility of using a fixed source of radiation inside of a tank of the type to which this invention particularly applies, and then using a fixed detector at a point outside of the tank but substantially above or below the source has been considered, but this is not satisfactory because the radiation passes obliquely through the walls of the tank at such a low angle that too large a part of the radiation is absorbed. This makes necessary the use of excessive amounts of radioactive material and the measurements are still not as accurate as is desired.

According to this invention, it has been discovered that in large tanks where a wide range of levels is to be measured, this can be done expediently and accurately by inserting into the tank a fixed source of radiation and then inserting into the tank in substantially vertical alignment therewith, a well containing a detector of the radiation. One of these two elements, preferably the source of radiation, can be placed just below the lowest level to be measured and the other element, preferably the well containing the detector, can be placed just above the highest level to be measured. Since this is usually below any baffles or plates or other apparatus in the tank, such baffles or plates or apparatus do not interfere with the operation of the measuring apparatus and since the radiations pass vertically between the source and the detector and pass perpendicularly through the walls of the well surrounding the detector, the radiation loss is held to a minimum, less radioactive material needs be used, and the results are much more accurate.

In order that the source of radioactive material may be renewed as desired, it has been found desirable also to insert a radioactive material in a well extending through the wall of the tank and an arrangement has been perfected so that this may be done expediently. It has also been found desirable to avoid the erosion of the container for the radioactive material by solid catalysts when a device is to be used to measure the level of solid catalysts, and this invention includes a particular construction of parts for that purpose, and also for the purpose of similarly protecting the well in which the detecting apparatus is positioned.

Further details and advantages of the apparatus of this invention will be apparent from a consideration of the following detailed description of the preferred embodiment thereof and from a consideration of the drawings illustrating this embodiment.

Figure 1 is a diagrammatic illustration, in cross-section, of a catalytic cracking tower in the bottom of which it is desired to measure catalyst level.

Figure 2 is a detail of Figure 1 on an enlarged scale illustrating in greater detail the detecting apparatus and the well containing it.

Figure 3 is a detail of Figure 1, also on an enlarged scale, illustrating the detailed construction of the well for the source of radioactivity and the source itself.

As illustrated in Figure 1, tank 10 contains a quantity of bead catalyst 11 which partially fills it, and above this bead catalyst a series of reflux plates 12. In order to measure the level of the catalyst, in accordance with the principles of this invention, three sources of radioactivity 13 have been inserted through the shell of the tank 10 just below the lowest level which it is desired to measure. Preferably these are spaced about a foot apart in a vertical direction and offset a few inches in a horizontal direction. The details of their construction will be described in connection with Figure 3.

Spaced directly above the sources of radioactivity, a distance of around twenty feet, is a steel well 15 extending about a foot into the interior of the tank and furnishing a housing in which is positioned a detector of radioactivity such as Geiger-Mueller counter or an ionization chamber. This detector is connected to a preamplifier 16 on the outside of the tank and from there by a conductor 17 to an amplifier 18 and a recorder 19 which are shown only diagrammatically. Details of the well 15 and the adjacent parts are shown in Figure 2.

As illustrated in Figure 2, the well 15 is a flanged cylinder closed at the end opposite the flange. It is inserted into a hole in the wall of the tank 10 and secured in place by a continuous weld 20. The well 15 may carry a grid-like structure 21 on its upper outside surface when it is to be so placed that a solid material will flow down over it and thus tend to erode the upper surface. In such a case, the grid work 21 on the upper surface of the well tends to collect solid material and the wear or erosion then takes place upon the solid material itself rather than upon the upper surface of the well 15.

Inside of the well 15 an ionization chamber 14 is supported in a spider 21' so as to be spaced from the sides of the well. Ordinarily, this ionization chamber 14 and the conductors leading from it are fully encased for protection. The encased conductors 22 lead to a preampler 23 and additional cased conductors 24 lead from the preamplifier to the final amplifier and the meter or recorder usually located at some distant point.

It is usually desirable to circulate cooling air around the ionization chamber 14 to prevent it from becoming overheated by the heat inside of the tank and for this purpose air is supplied to an air jet ring 25 which directs cool air around the detector in the well.

With reference now to Figure 3, a relatively heavy, tubular housing 30 extends through the wall of the tank 10 and is secured thereto by welds 31 and 32. Within this housing is a second or inner housing 33 which is also tubular in form and which is threaded near its outer end and provided with a nut so that it can be threaded tightly into the outer housing. This inner housing is much thinner than the outer housing but provides a seal against leakage through the inner bore of the outer housing. The inner bore of the outer housing is open in an upward direction at 34 to provide an area about two inches long and one inch wide where the inner housing 33 is exposed directly to the materials inside of the tank.

Inside of the inner housing 33 is a rod 35 provided with a nut and threads at its outer end so that it can be screwed tightly into the inner housing. At the inner end of this inner rod 35 is the radioactive material 36. Thus when the outer housing 30, the inner housing 33 and the rod 35 are all assembled, radioactive material is contained in the rod 35 in a position where it will lie directly under the opening 34 in the outer housing. Thus, the radiation need pass only through the surrounding part of the rod 35 and the surrounding part of the inner housing 33 and then upward through the catalyst to the detector 14.

The outer end of the main housing 30 has a flange 40 welded to it and a flat cover plate 41 fastened to this flange by bolts 42 to close the housing and enclose the inner housing 33 and the radioactive material-containing rod 35.

As bead catalyst or other aggregate solid material flows downward through the tank 10 it will necessarily strike the outer housing 30 and tend to erode that housing. If it were not for that housing, the inner housing 33 and the rod 35 would soon be eroded away. However, at the opening 34 the catalyst or other aggregate material tends to fill the opening and only this catalyst or aggregate material is eroded and not the inner housing 33. Thus the inner housing 33 and the radioactive material-containing rod 35 are protected against erosion, even at this open area, and yet this is done without interfering with or impeding the radiation that is to be measured to determine level.

It will be apparent that many modifications may be made of the specific embodiment of this invention illustrated in the drawings, all within the scope of this invention and the appended claims.

What is claimed is:

1. In a container adapted to have a solid material flow downwardly through it and having a vertical side wall of substantial height, the improvement that comprises a source of radioactive radiations in a fixed position inside said container near the inner surface of said side wall, said source of radioactive radiations having only a relatively thin covering wall above it to prevent erosion, a member surrounding said covering above said radioactive source and shaped to hold a quantity of said solid material flowing through said tank so that said solid material will prevent erosion of the covering for said radioactive material, a well extending through said side wall in substantial vertical alignment with said source and at a substantial distance therefrom, a detector of radioactive radiations in said well and means for indicating the amount of radiations detected, as an indication of the level of material contained in said container.

2. In a container having a vertical side wall of substantial height, an improvement that comprises a source of radioactive radiations in a fixed position inside said container near the inner surface of said side wall, a well extending through said side wall in substantial vertical alignment with said source and at a substantial distance therefrom, a detector of radioactive radiations in said well and means for indicating the amount of radiation detected, as an indication of the level of the material contained in said container, said source of radioactive radiations including a well welded into the side of the tank and open near its inner end in an upward direction, and a radioactive material holder threadedly held and sealed in said well with the radioactive material lying directly under the upwardly directed opening in the well.

3. In a container having a vertical side wall of substantial height, an improvement that comprises a source of radioactive radiations in a fixed position inside said container near the inner surface of said side wall, a well extending through said side wall in substantial vertical alignment with said source at a substantial distance therefrom, a detector of radioactive radiations in said well and means for indicating the amount of radiation detected, as an indication of the level of material contained in said container, and a grid work provided on top of the detector well to protect the detector well against erosion.

UNITED STATES PATENTS
References Cited in the file of this patent

| Number | Name | Date |
|---|---|---|
| 1,808,709 | Blake | June 2, 1931 |
| 2,323,128 | Hare | June 29, 1943 |
| 2,456,233 | Wolf | Dec. 14, 1948 |
| 2,506,585 | Elliott | May 9, 1950 |